(No Model.) 2 Sheets—Sheet 1.

T. THRELFALL.
Machine for Separating and Cleaning Vegetable Fiber.

No. 235,108. Patented Dec. 7, 1880.

WITNESSES
Wilmer Bradford
E. Patten

INVENTOR
Thomas Threlfall
By C. W. M. Smith
Attorney (No Model.) 2 Sheets—Sheet 2.
T. THRELFALL.
Machine for Separating and Cleaning Vegetable Fiber.
No. 235,108. Patented Dec. 7, 1880.
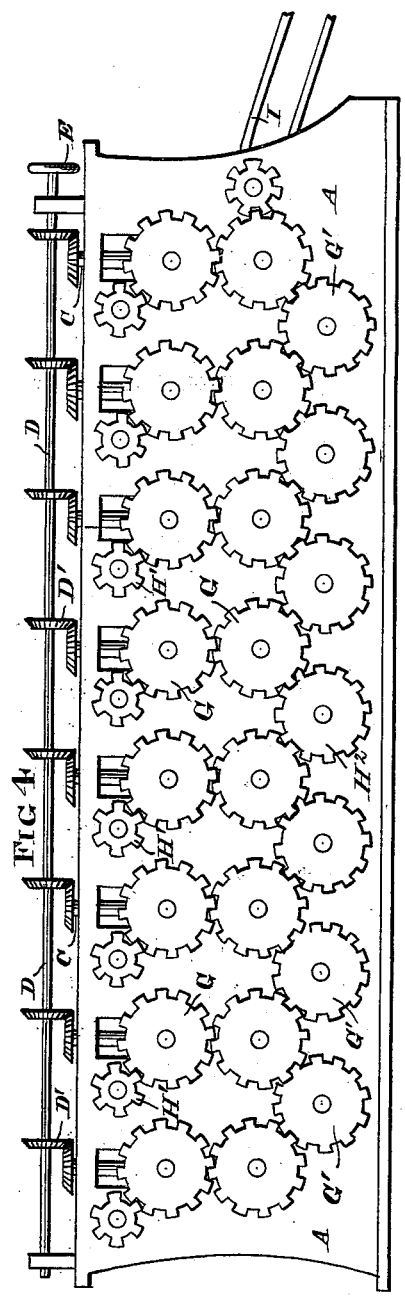
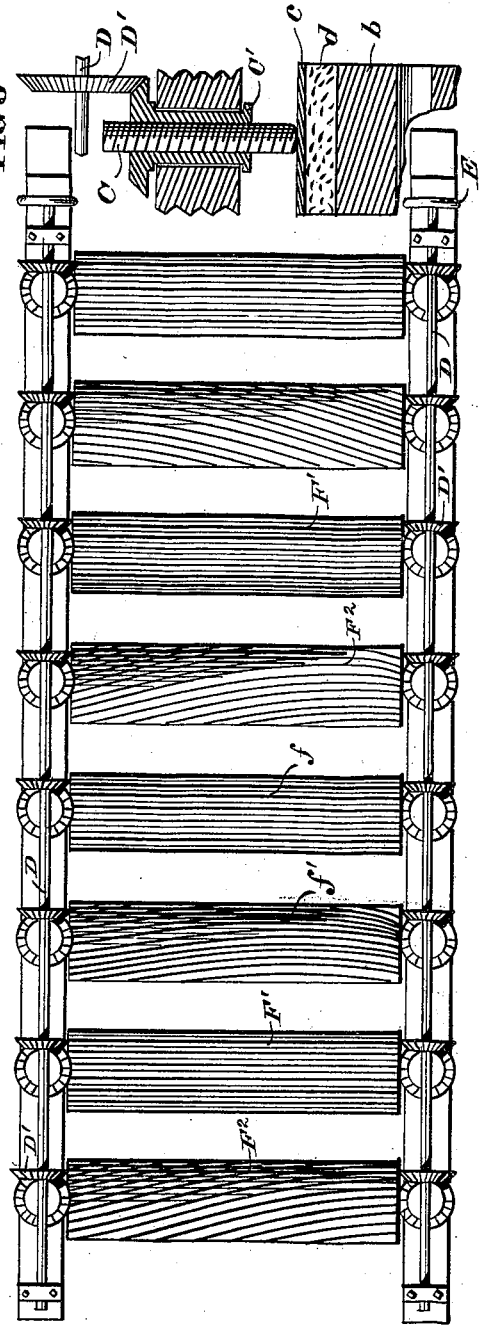
WITNESSES
Wilmer Bradford
E. Patten
INVENTOR
Thomas Threlfall
By C. Wm. Smith
Attorney

UNITED STATES PATENT OFFICE.

THOMAS THRELFALL, OF SAN FRANCISCO, CALIFORNIA.

MACHINE FOR SEPARATING AND CLEANING VEGETABLE FIBER.

SPECIFICATION forming part of Letters Patent No. 235,108, dated December 7, 1880.

Application filed June 10, 1880. (No model.)

*To all whom it may concern:*

Be it known that I, THOMAS THRELFALL, of the city and county of San Francisco, State of California, have invented a new and useful Machine for Separating and Cleaning Vegetable Fiber, of which the following is a specification.

My invention relates to improvements in machines for separating and cleaning vegetable fibers, such as ramie, jute, flax, hemp, and other fibrous plants, and is mainly adapted to the treatment of the plant called "ramee" or "rhea," whereby the fiber of this and other plants is produced in a much better condition than has heretofore been possible by other means. I attain this object by the mechanism illustrated in the accompanying drawings, in which—

Figure 1:
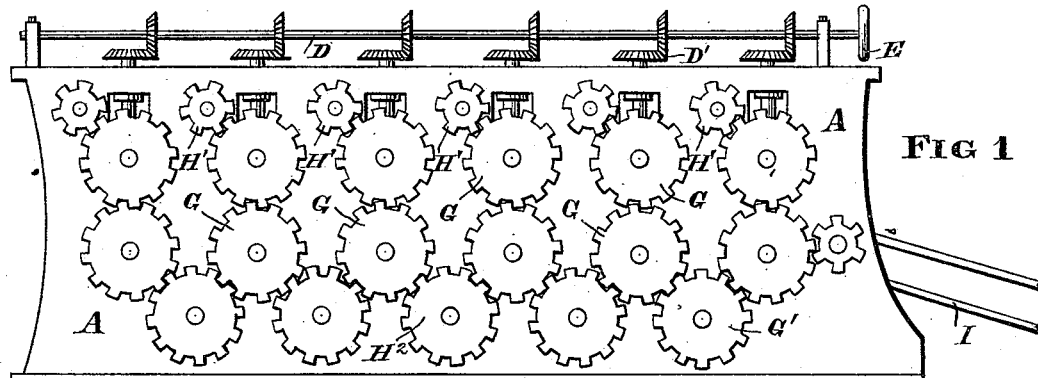
Figure 2:
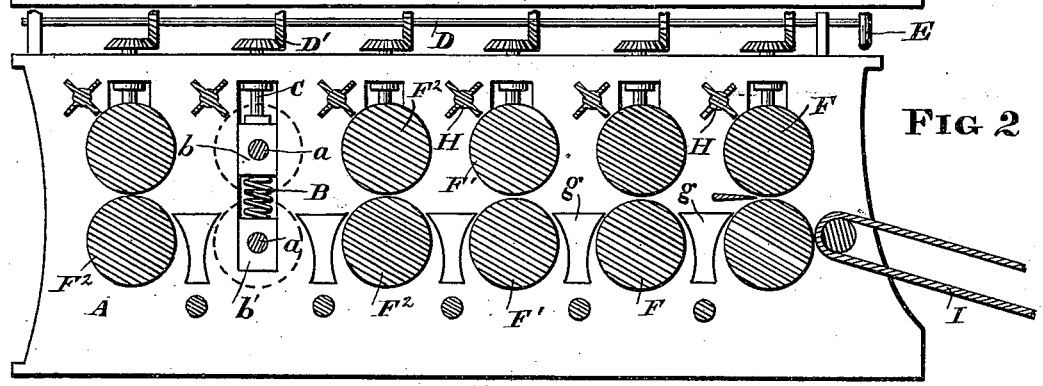
Figure 3:
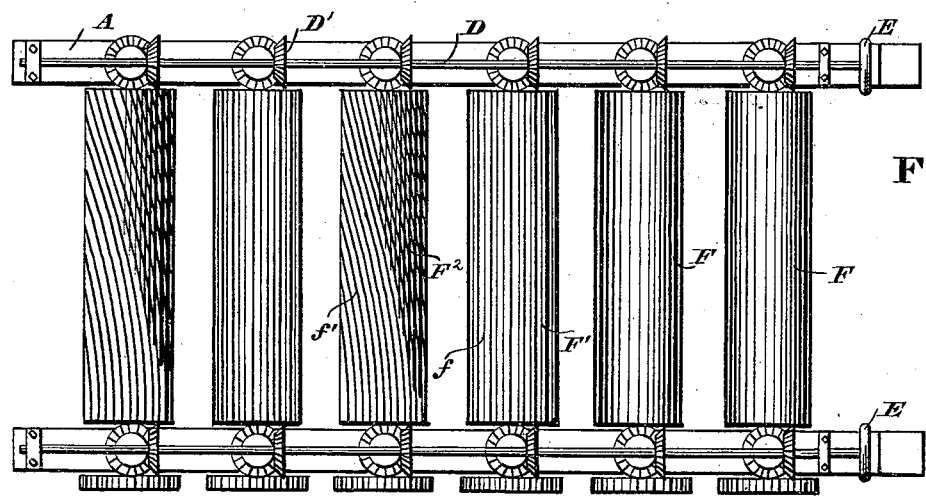

Figure 1 is a side elevation of my machine. Fig. 2 is a longitudinal sectional view. Fig. 3 is a top view; Fig. 4, Sheet 2, a side view; Fig. 5, Sheet 2, a top view; Fig. 6, Sheet 2, a detail view, showing the pressure-regulating mechanism for the upper series of rollers.

Similar letters refer to similar parts throughout the several views.

Upon a table or frame having suitable legs or standards for a proper support I place my machine or apparatus, which consists of a series of six or more sets of rollers. Each set is composed of two rollers, and one roller is placed above the other throughout the whole series. These several sets of rollers are held and supported in the sides of a frame, A A, by means of journals $a$ and boxes $b\ b'$, in such a manner that the upper series of rollers will move up and down automatically, according to the thickness of the stalks or fiber which is caused to pass between them, the object being to effect a sufficient amount of pressure to reduce the stalk and separate the woody portion and gum or bark without cutting or otherwise injuring the fiber in passing through or between the rollers.

To accomplish this object I place a spiral spring, B, between the journal-boxes $b\ b'$ of the rollers, and upon the top of the upper boxes vertical screw-studs C, which move in the screw-cylinders C'. These screw-guides extend to the top of the frame at both sides and connect with the longitudinal shafts D by means of the beveled miter-gears D'. The points of these screw-studs rest upon the plate $c$, between which and the top of the journal-boxes $b$ is placed a spring or packing of india-rubber, $d$. By this means a greater or less pressure can be applied to the material passing between the rollers. Upon turning the horizontal shafts by the hand-wheels E, attached to one end of the shaft, the rollers are drawn nearer together or farther apart, according to the distance in which the vertical screws are caused to travel, while the spiral springs B serve to keep the rollers apart and provide that elastic or yielding pressure so essential to the treatment of fiber, in order to prevent bruising or cutting in passing through the corrugated rollers of which my machine is composed, and which will hereinafter be more fully described.

The first two sets or forward rollers, F, of my machine are composed of smooth or plain surfaces, and these are succeeded by four or more sets of corrugated rollers, F' F², every alternate set being corrugated spirally, as shown at $f\ f'$. All of these rollers are provided with a toothed wheel, G, at one end, which mesh into each other, so that when power is applied to one it operates, by means of the connecting idler cog-wheels G', the whole series.

Between each lower set of rollers I place a shelf, $g$, over which the material slides or passes on its way to the upper end of the machine; and between each set of the upper rollers I place a rotating fan, H, which is caused to travel or rotate in the same direction as that of the material, and this serves to keep down all of the slivers of the fiber and prevent it from adhering to the rollers. They are operated by the spur-wheels H'. I operate my machine by a pulley-and-belt connection (not shown) to the spur-wheel H².

The stalks are first thoroughly dried in the sun or by artificial heat, so as to expel the sap, juice, or gum, and they are fed to the machine continuously endwise by the endless apron or belt I passing between the first series of smooth rollers and on between the second series of smooth rollers, which thoroughly crush the stalks lengthwise, thence on between the corrugated rollers, those having spiral corrugations being arranged alternately with those having longitudinal corrugations. These rollers F' F² break and partially strip the woody portion of the stalk into fine particles, according to the fineness of the corrugations, the corrugations of all the rollers being round or without angles or sharp edges, so as not to cut the fiber. The woody portion, having been separated from the fiber, is caused to drop in broken bits between the rollers, and the bark with the fiber passes on or is carried out at the upper end of the machine, and this latter operation I term the "stripping process," or removing or separating the wood from the fiber.

When a sufficient quantity of material has been stripped, then the two sets of plain rollers may be removed and the longitudinally-corrugated rollers substituted in their place, and the stripped fiber is then passed through the machine in bulk, for the cleaning process, in layers of from one to twelve inches in thickness, which removes the bark from the fiber which remains after having passed through the machine the first time, as above described.

The longitudinal corrugations cut the bark in a transverse manner, and the spiral corrugations cut it in a diagonal manner after the longitudinal transverse corrugations have been made. The fiber is now easily deprived of all remaining bark or gum left after the previous manipulation, which is beaten out and falls in fine particles beneath the rollers. The rollers, being held in springs or elastic bearings, will accommodate themselves to the unequal thickness of the fiber which is being fed to them.

For the purpose of more thoroughly cleaning and separating the bark from the fiber in this last operation, I provide a means for producing a horizontal reciprocating or a forward-and-back motion, so that the fiber will pass more slowly through the machine and be subject to a repeated action of the corrugated rollers. This motion may be accomplished by so many different means that I do not deem it necessary to suggest any particular device for the purpose. Suffice it to say that it may be attached to and be combined with the pulley which drives the machine—that is to say, the spur-wheel H², which operates all of the rollers by the meshing of each into the other. This driving-pulley may be made so as to convert the action of the rollers into a horizontal reciprocating motion or a continuous rotary motion, as desired. By this means the fiber of the plant called "ramee," which heretofore has been found so difficult to separate and clean in such a manner as to place it in the market extensively as an article of commerce, can be furnished in a thoroughly cleaned manner and at a moderate cost of manipulation.

Having thus described my invention, what I claim, and desire to secure by Letters Patent, is—

1. In a machine adapted for separating and cleaning plants of fibrous material, the combination and arrangement of a set or series of smooth longitudinally and spirally corrugated rollers, each set composed of two rollers operated on journals $a$ $a$ in boxes $b$ $b'$, with a rotating fan, H, between each set of said rollers, substantially in the manner and for the purposes herein set forth and specified.

2. In a machine adapted to separating and cleaning fiber of plants, having a series of transverse rotary rollers operating in journals and journal bearings or boxes, the combination of the spiral springs B, elastic packing $d$, and screw-studs and cylinders C C', operated by horizontal shafting D and beveled gears D', so as to elevate and depress the rollers and impart to them an elastic and yielding action, to engage and operate upon material of unequal thickness passing between the said rollers, constructed and arranged and operating substantially in the manner as herein set forth and specified.

In testimony that I claim the foregoing I have hereunto set my hand and seal this 28th day of May, 1880.

THOMAS THRELFALL. [L. S.]

Witnesses:
C. W. M. SMITH,
JAMES C. WARD.